(12) United States Patent
Tzeng et al.

(10) Patent No.: US 6,994,608 B1
(45) Date of Patent: Feb. 7, 2006

(54) METHODS OF MANUFACTURING SLIDERS

(75) Inventors: Huey-Ming Tzeng, San Jose, CA (US); Xiao Z. Wu, San Jose, CA (US)

(73) Assignee: Hitachi Global Storage Technologies Netherlands, B.V., (NL)

( * ) Notice: Subject to any disclaimer, the term of this patent is extended or adjusted under 35 U.S.C. 154(b) by 0 days.

(21) Appl. No.: 10/987,432

(22) Filed: Nov. 12, 2004

(51) Int. Cl.
*B24B 49/04* (2006.01)

(52) U.S. Cl. ............................ 451/5; 451/57
(58) Field of Classification Search ............. 451/5, 451/1, 57, 58, 37, 41, 8; 29/603.16, 603.15
See application file for complete search history.

(56) References Cited

U.S. PATENT DOCUMENTS

| | | | |
|---|---|---|---|
| 4,549,238 A * | 10/1985 | Ertingshausen et al. | 360/235.3 |
| 5,023,991 A | 6/1991 | Smith | |
| 5,095,613 A | 3/1992 | Hussinger et al. | |
| 5,494,473 A | 2/1996 | Dupuis et al. | |
| 5,605,489 A * | 2/1997 | Gale et al. | 451/28 |
| 5,749,769 A * | 5/1998 | Church et al. | 451/5 |
| 5,755,612 A * | 5/1998 | Schaenzer et al. | 451/5 |
| 5,911,455 A | 6/1999 | Draaisma et al. | |
| 6,093,083 A * | 7/2000 | Lackey | 451/28 |
| 6,195,871 B1 | 3/2001 | Watanuki | |
| 6,196,897 B1 | 3/2001 | Suto et al. | |
| 6,264,535 B1 * | 7/2001 | Chang et al. | 451/28 |
| 6,370,763 B1 | 4/2002 | Watanuki et al. | |
| 6,551,173 B2 | 4/2003 | Boutaghou | |
| 6,758,722 B2 | 7/2004 | Zhu | |
| 2001/0004800 A1 | 6/2001 | Yoshida et al. | |
| 2001/0012748 A1 | 8/2001 | Sone et al. | |
| 2002/0053137 A1 | 5/2002 | Sasaki et al. | |
| 2002/0066177 A1 | 6/2002 | Takada et al. | |
| 2002/0112343 A1 | 8/2002 | Goubau et al. | |
| 2003/0148715 A1 | 8/2003 | Boutaghou | |
| 2003/0199228 A1 | 10/2003 | Kennedy et al. | |
| 2003/0200041 A1 | 10/2003 | Church et al. | |
| 2004/0075942 A1 | 4/2004 | Bajorck | |

\* cited by examiner

*Primary Examiner*—Robert A. Rose
(74) *Attorney, Agent, or Firm*—Duft Bornsen & Fishman, LLP

(57) ABSTRACT

Methods of manufacturing sliders are disclosed. In one method, a wafer of sliders is parted into rows of sliders. Each row includes a plurality of sliders connected by kerfs. For an individual row, the kerfs between the sliders are partially parted from a flex side of the row. The flex side of the row is opposite an air bearing surface (ABS) side of the row. The depth of partially parting the kerfs corresponds with a lapping depth for lapping the row. The row is then lapped from the air bearing surface side to remove the remaining kerfs between the sliders to separate the row into individual sliders.

22 Claims, 6 Drawing Sheets

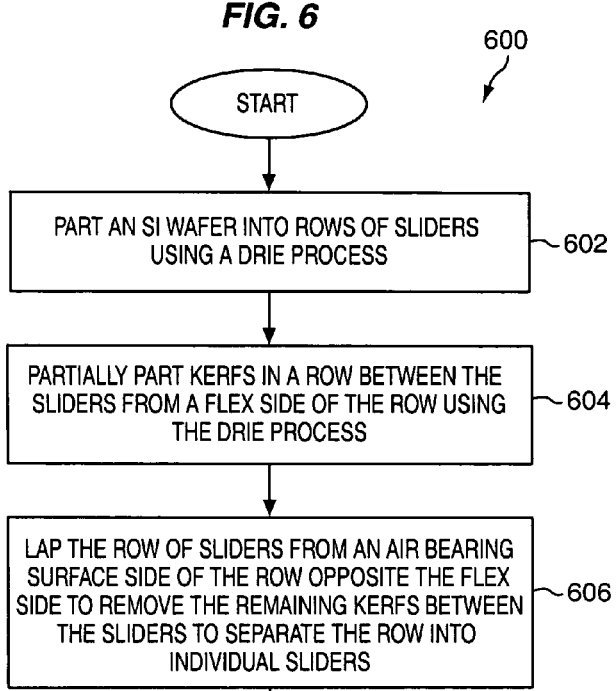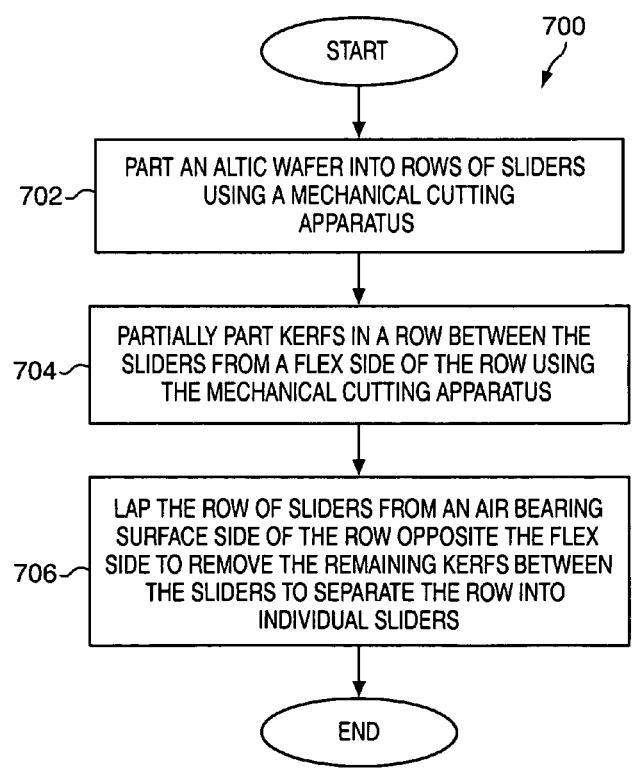

METHODS OF MANUFACTURING SLIDERS

BACKGROUND OF THE INVENTION

1. Field of the Invention

The invention is related to the field of magnetic storage devices, and in particular, to methods for manufacturing sliders using a lapping process.

2. Statement of the Problem

Many computer systems use disk drives for mass storage of information. Disk drives typically include one or more sliders or heads that write to and read from a storage media. To read data from the storage media, the storage media spins and generates a magnetic field. The magnetic field in the presence of a sensor in the slider, such as a Giant Magneto-Resistive (GMR) sensor, modulates the resistance of the sensor. The change in resistance of the sensor is detected by passing a sense current through the sensor and then measuring the change in voltage across the sensor. The resulting signal is used to recover the data encoded on the storage media. To write data to the storage media, an inductive element in the slider produces a magnetic field that records the data on the storage media.

Sliders are typically manufactured on a substrate wafer that includes an array of sliders. The sliders are arranged in rows on the wafer with kerfs between the sliders connecting the sliders in the row. The most commonly used material used to fabricate a wafer is an aluminum oxide—titanium carbide compound ($Al_2O_3$—TiC) (referred to herein as Alumina Titanium Carbide or AlTiC). An AlTiC wafer is first cut into quadrants with a mechanical saw. For each quadrant, a rough lapping process is performed on an air bearing surface (ABS) side of a row of sliders in the quadrant. The rough lapping process removes many microns of material on the air bearing surface of the sliders to a desired rough lapping depth. Typically, the quadrants are parted into separate rows or individual sliders before they are lapped to the final target forms using finer lapping plates. If the final lapping is done in the row form, the row of sliders can be partially cut between the sliders in the kerfs from the air bearing surface side of the row to allow for flexing of the row during the rough lapping process. The row is then final lapped and parted to individual sliders. If the final lapping is done on individual sliders, a final lapping process is performed on the individual sliders to create a target sensor height of the sensor in each individual slider. The target sensor height provides a desired magnetic characteristic for the sensor in each individual slider and it may be reflected by the resistance of the sensor. The final lapping process also creates the base plane on which the air bearing pattern will be created in following processes to allow the slider to fly at desired height above a storage media.

Another material used to fabricate a wafer is silicon. Sliders made from silicon have some advantages over sliders made from AlTiC. First, silicon sliders tend to have a lower mass and may cause less damage to the storage media if the slider contacts the storage media. Also, using silicon to fabricate the sliders allows for building integrated circuits into the sliders using well-known semiconductor technologies.

One challenge in manufacturing sliders out of silicon is that silicon is more brittle than AlTiC and may chip or crack if cut using a mechanical saw. Thus, a Deep Reactive Ion Etching (DRIE) process is used to part the wafer into individual sliders. Parting refers to cutting or otherwise separating the wafer. The DRIE process may part the entire wafer into individual sliders. One problem with parting the entire wafer into individual sliders using the DRIE process is that performing a rough lapping process on individual sliders is not efficient. There is about 20 $\mu$m of material that needs to be removed from the air bearing surface of the individual sliders. Removing 20 $\mu$m of material on an individual slider basis may create the additional problem of the air bearing surface of the slider not being perpendicular to the deposit end of the slider.

The DRIE process may also part the wafer into rows of sliders. For an individual row of sliders, a rough lapping process is performed on an air bearing surface side of the row of sliders. The DRIE process is then used to part the row into individual sliders. One problem with parting rows of sliders in this manner is that every row needs to be parted using the DRIE process again, which can be costly. The rows may also be parted into individual sliders by re-aligning the rows into an array and using the DRIE process on the array to part the individual sliders. One problem with parting rows of sliders in this manner is that it involves an additional process and may not be precise. Additionally, the DRIE process involves chemicals which may be dangerous to sensors, especially after the sensors are exposed after the rough lapping process.

SUMMARY OF THE SOLUTION

The invention solves the above and other related problems with methods for manufacturing sliders out of a wafer, especially Si wafers, using a lapping process. The process separates a row into individual sliders without the need for further cutting, parting, or separating. In one method embodying the invention, the wafer is first parted into rows of sliders. Each row includes a plurality of sliders connected by kerfs. For an individual row, the kerfs in the row are partially parted from a flex side of the row. The flex side of the row is opposite an air bearing surface (ABS) side of the row. The depth of partially parting the kerfs corresponds with a lapping depth for lapping the row. The row is then lapped from the air bearing surface side to remove the remaining kerfs between the sliders to separate the row into individual sliders. For AlTiC wafers, the partial parting may be achieved by controlling the saw-cutting depth. For Si wafers, the partial parting may be achieved by designing proper DRIE masks.

The lapping process advantageously separates the row into individual sliders without the need for further cutting, parting, or separating. Because the depth of partially parting the kerfs corresponds with the lapping depth desired for the lapping process, the lapping of the row separates the row into individual sliders. For AlTiC wafers, individual sliders do not need to be cut from rows using a mechanical cutting apparatus because the lapping process separates the sliders. For Si wafers, individual sliders do not need to be parted from rows using a DRIE process because the lapping process separates the sliders. This avoids the problems of using the DRIE process to part the row after lapping the row.

The invention may include other exemplary embodiments described below.

DESCRIPTION OF THE DRAWINGS

The same reference number represents the same element on all drawings.

FIG. 6 is a flow chart illustrating a method of manufacturing sliders out of a silicon (Si) wafer in an exemplary embodiment of the invention.

FIG. 7 is a flow chart illustrating a method of manufacturing sliders out of an AlTiC wafer in an exemplary embodiment of the invention.

DETAILED DESCRIPTION OF THE INVENTION

FIGS. 1–13 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
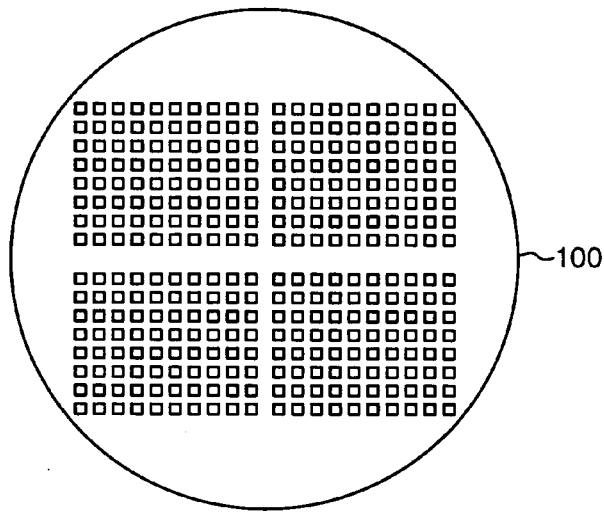
FIG. 1 illustrates a wafer of with sliders.

FIGS. 1–5 illustrate a method of manufacturing sliders in an exemplary embodiment of the invention. FIG. 1 illustrates a wafer 100 of sliders. The sliders are arranged in rows on the wafer with kerfs between the sliders connecting the sliders in the rows. The dotted lines on FIG. 1 illustrate row parting lines normal to the wafer plane, which will define the Air Bearing Surface (ABS) of the sliders. Some materials used to fabricate wafer 100 may be Alumina Titanium Carbide (AlTiC) or silicon (Si). After being fabricated, wafer 100 is manufactured into individual sliders.

Figure 2:
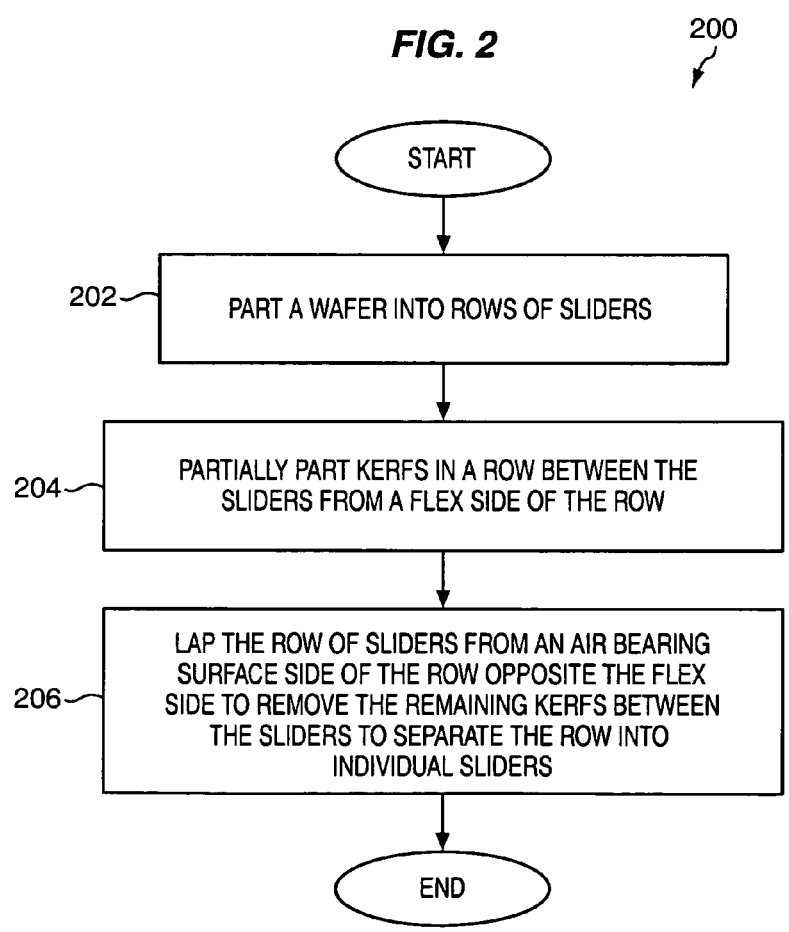
FIG. 2 is a flow chart illustrating a method of manufacturing sliders out of a wafer in an exemplary embodiment of the invention.

FIG. 2 is a flow chart illustrating a method 200 of manufacturing sliders out of wafer 100. In step 202, wafer 100 is parted into rows of sliders. "Parting" refers to cutting or otherwise separating a wafer or row of sliders. Different processes may be used to part wafer 100 depending on the material used to fabricate wafer 100.

Figure 3:
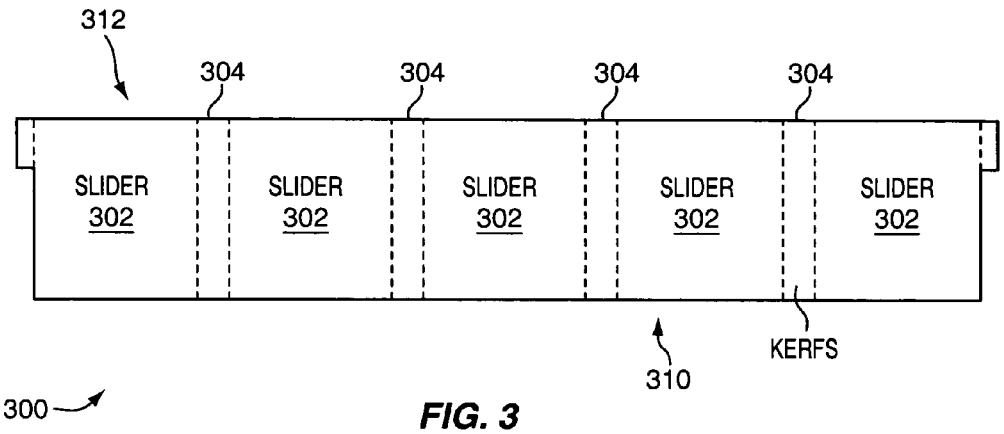
FIG. 3 illustrates a row of sliders in an exemplary embodiment of the invention.
Figure 4:
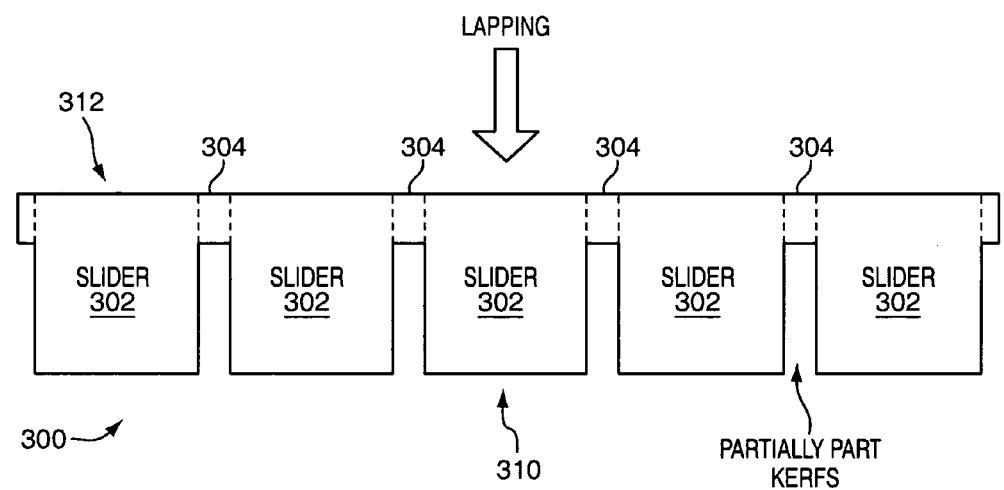
FIG. 4 illustrates a row with kerfs partially parted in an exemplary embodiment of the invention.
Figure 5:
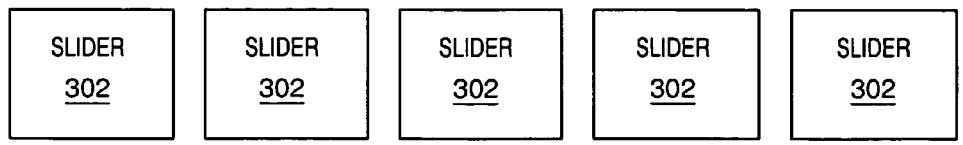
FIG. 5 illustrates individual sliders after lapping a row in an exemplary embodiment of the invention.

FIGS. 3–5 illustrate a row of sliders as manufactured according to method 200 in FIG. 2. FIG. 3 illustrates a row 300 of sliders 302 that has been separated from wafer 100. Row 300 includes a plurality of sliders 302 connected by kerfs 304. Although five sliders are shown, row 300 may include more sliders 302.

In step 204 of FIG. 2, kerfs 304 in row 300 are partially parted between the sliders 302 from a flex side 310 of row 300. Flex side 310 of row 300 is opposite an air bearing surface (ABS) side 312 of row 300. FIG. 4 illustrates row 300 with kerfs 304 partially parted. The depth of partially parting kerfs 304 corresponds with a lapping depth for lapping row 300. In other words, the remaining kerfs 304 after partially parting should be a similar depth to the desired lapping depth.

In step 206 of FIG. 2, row 300 is lapped from air bearing surface side 312 to remove the remaining kerfs 304 between sliders 302 to separate row 300 into individual sliders 302. The lapping process used in step 206 may be referred to as rough lapping, but is not limited to rough lapping. By partially parting kerfs 304 to the lapping depth in step 204 (see FIG. 4), the lapping of row 300 in step 206 separates row 300 into individual sliders 302. FIG. 5 illustrates the individual sliders 302 after lapping row 300. Further cutting, parting, or separating is not needed because the lapping process in step 206 advantageously performs the separation. Method 200 in FIG. 2 may include other steps not shown in FIG. 2.

The methods of manufacturing wafers, such as wafer 100, may vary based on the material used to fabricate the wafer. FIG. 6 is a flow chart illustrating a method 600 of manufacturing sliders out of a silicon (Si) wafer in an exemplary embodiment of the invention. Assume for illustration that wafer 100 is fabricated out of silicon (Si) material. In step 602, Si wafer 100 (see FIG. 1) is parted into rows, such as row 300 in FIG. 3, using a Deep Reactive Ion Etching (DRIE) process. In step 604, kerfs 304 between sliders 302 are partially parted from a flex side 310 of row 300 using the DRIE process (see FIG. 4). The same DRIE process or a separate DRIE process may be used for steps 602 and 604. The depth of partially parting kerfs 304 corresponds with a lapping depth for lapping row 300. In other words, the remaining kerfs 304 after partially parting should be a similar depth to the desired lapping depth. In step 606, row 300 is lapped from air bearing surface side 312 to remove the remaining kerfs 304 between sliders 302 to separate row 300 into individual sliders 302 (see FIGS. 4–5). By partially parting kerfs 304 to the lapping depth in step 604 (see FIG. 4), the lapping of row 300 in step 606 separates row 300 into individual sliders 302. Method 600 in FIG. 6 may include other steps not shown in FIG. 6.

Alternatively, FIG. 7 is a flow chart illustrating a method 700 of manufacturing sliders out of an AlTiC wafer in an exemplary embodiment of the invention. Assume for illustration that wafer 100 is fabricated out of AlTiC material. In step 702, AlTiC wafer 100 (see FIG. 1) is parted into rows using a mechanical cutting apparatus, such as a mechanical saw. In step 704, kerfs 304 between sliders 302 are partially parted from a flex side 310 of row 300 using the mechanical cutting apparatus (see FIG. 4). The depth of partially parting kerfs 304 corresponds with a lapping depth for lapping row 300. In other words, the remaining kerfs 304 after partially parting should be a similar depth to the desired lapping depth. In step 706, row 300 is lapped from air bearing surface side 312 to remove the remaining kerfs 304 between the sliders 302 to separate row 300 into individual sliders 302 (see FIGS. 4–5). By partially parting kerfs 304 to the lapping depth in step 704 (see FIG. 4), the lapping of row 300 in step 706 separates row 300 into individual sliders 302. Method 700 in FIG. 7 may include other steps not shown in FIG. 7.

Figure 8:
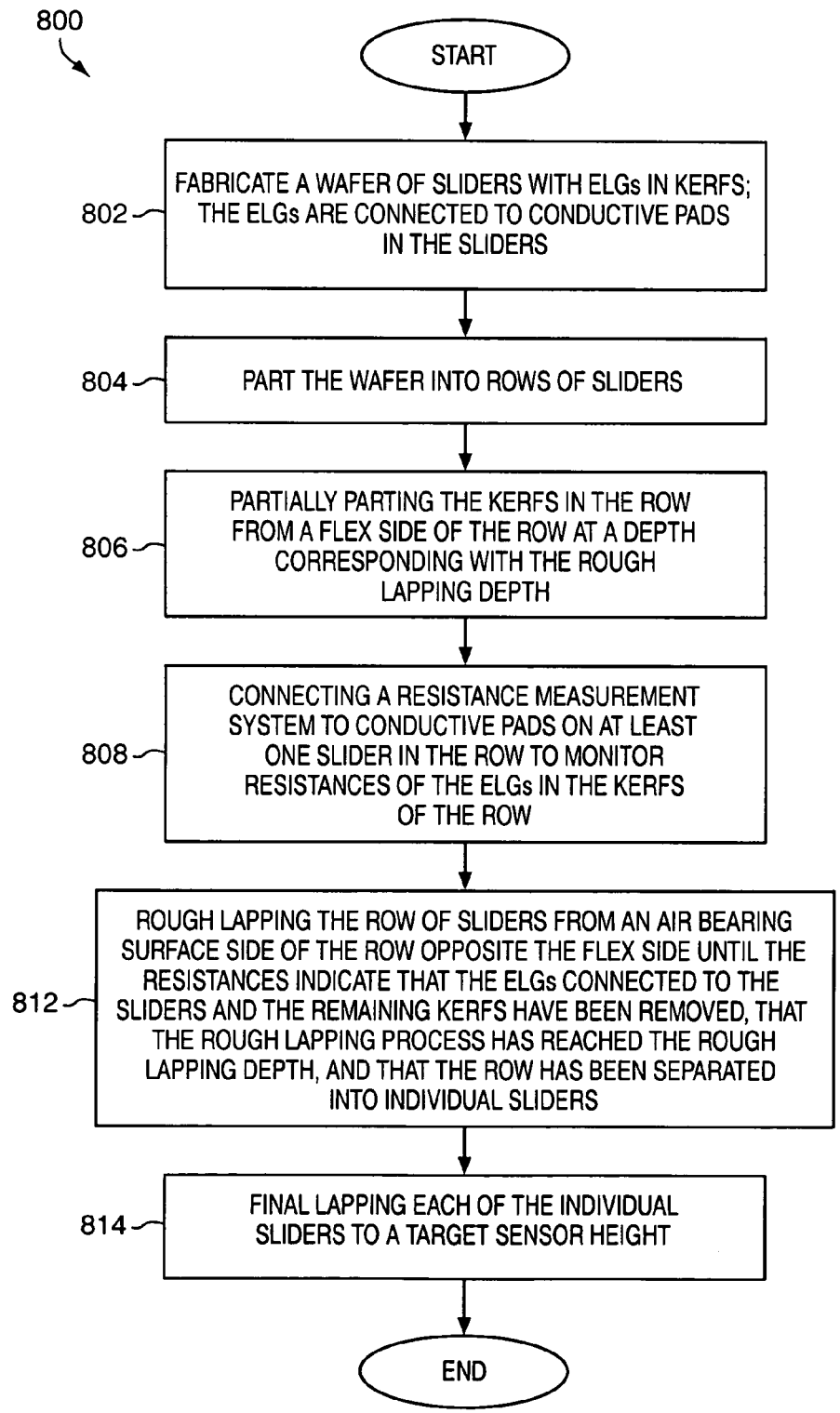
FIG. 8 is a flow chart illustrating another method of manufacturing sliders out of a wafer in an exemplary embodiment of the invention.

FIGS. 8–13 illustrate another method of manufacturing sliders in an exemplary embodiment of the invention. FIG. 8 is a flow chart illustrating a method 800 of manufacturing sliders out of a wafer. In step 802, a wafer of sliders is first fabricated with electrical lapping guides (ELG) in kerfs between sliders in the wafer. For any given row of sliders in the wafer, there may be an ELG in each of the kerfs, an ELG in every other one of the kerfs, an ELG in every fourth one of the kerfs, etc.

Figure 9:
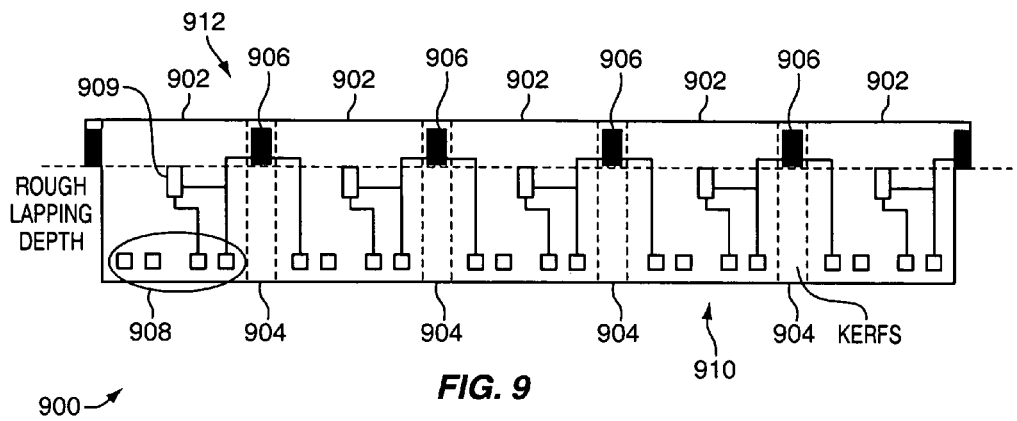
FIG. 9 illustrates a row of sliders in an exemplary embodiment of the invention.
Figure 12:
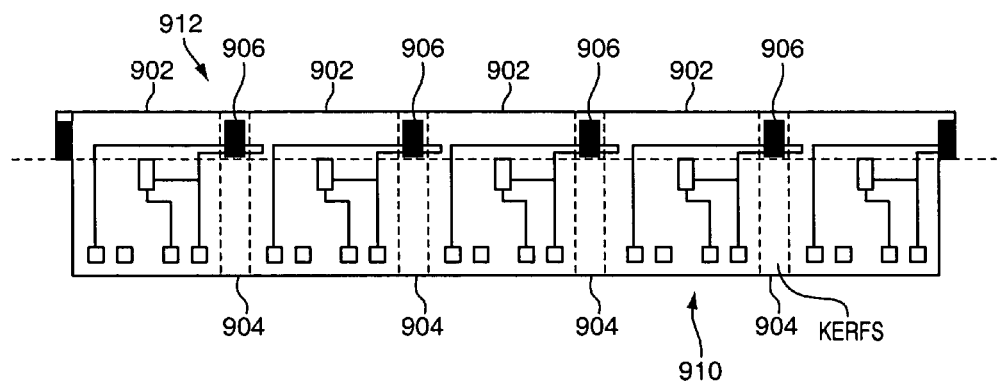
FIG. 12 illustrates a row of sliders in another exemplary embodiment of the invention.
Figure 13:
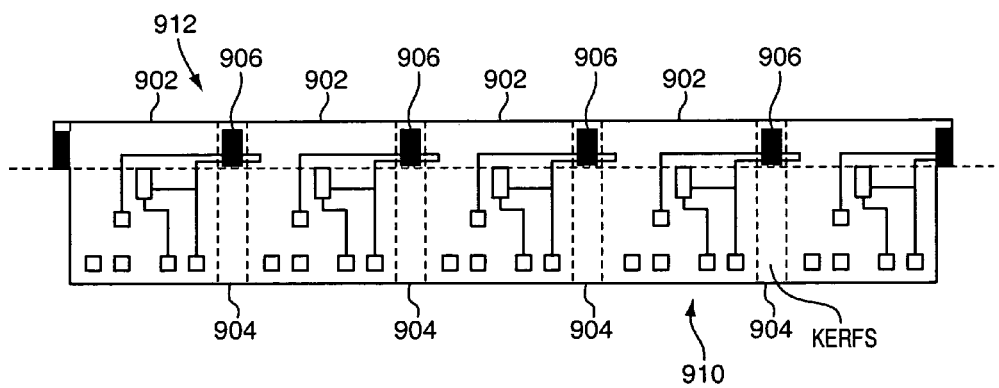
FIG. 13 illustrates a row of sliders in another exemplary embodiment of the invention.

An ELG in the kerfs between two sliders is connected to conductive pads on one or both of the two sliders so that the resistance of the ELG can be measured. For instance, one leg of the ELG may be connected to a conductive pad on one slider, and the other leg of the ELG may be connected to a conductive pad on another adjacent slider. FIG. 9 illustrates this configuration. A second example is for one leg of the ELG being connected to one of the conductive pads for the reader element on a slider, and the other leg being connected to the one of the conductive pads for writer element on the same slider. FIG. 12 illustrates this configuration. A third example is for one leg of the ELG being connected to one of the conductive pads for the read or write elements on a slider, and the other leg being connected to a conductive pad specifically created for the ELG measurement on the same slider. FIG. 13 illustrates this configuration.

Depending on the connections of the ELG legs, the resistance of the ELG can be measured across two conductive pads. The resistance of an ELG is low when the ELG is intact, and it will increase monotonically as the ELG material is lapped away along with other slider materials. When the rough lapping target is reached, the ELG should be completely removed and the ELG resistance should be very high, resembling an open circuit.

Also in the fabrication process, the ELG's are positioned in the kerfs to correspond with a lapping depth for lapping the sliders. For a row of sliders in the wafer, the ELG's are located in the kerfs in an area between the lapping depth designated for the row of sliders and the air bearing surface side of the row.

In step 804 of method 800, the wafer is parted into rows of sliders. If the wafer is made from silicon material, a DRIE process is used to part the wafer. If the wafer is made from AlTiC material, a mechanical cutting apparatus is used to part the wafer.

Figure 10:
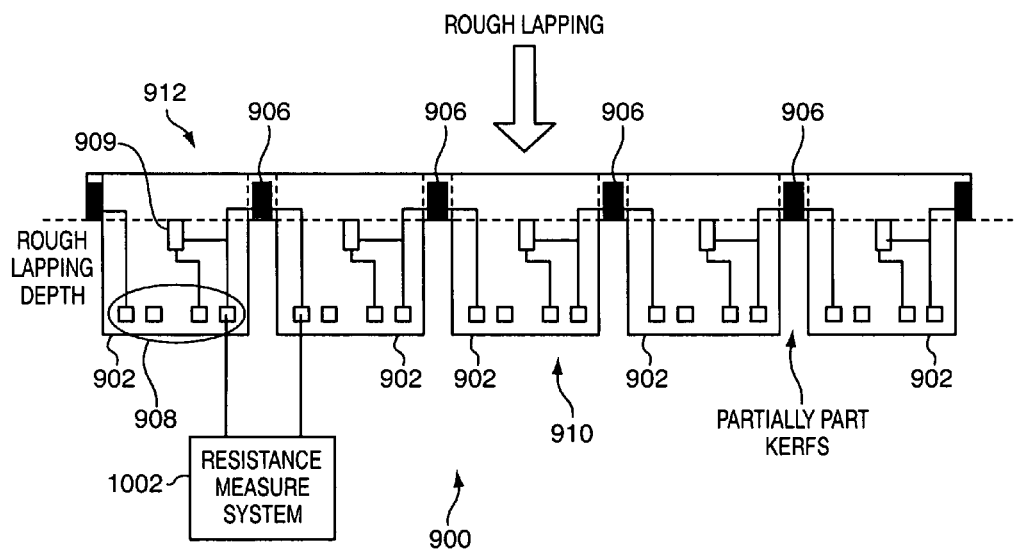
FIG. 10 illustrates a row with the kerfs partially parted in an exemplary embodiment of the invention.
Figure 11:
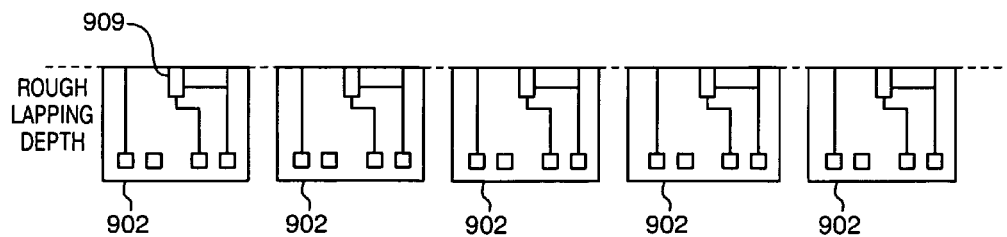
FIG. 11 illustrates individual sliders after lapping a row in an exemplary embodiment of the invention.

FIGS. 9–11 illustrate a row of sliders as manufactured according to method 800 in FIG. 8. FIG. 9 illustrates a row 900 of sliders 902 that has been separated from a wafer. Row 900 includes a plurality of sliders 902 connected by kerfs 904. ELG's 906 are positioned in kerfs 904 between sliders 902 to correspond with a rough lapping depth. In other words, ELG's 906 are located in kerfs 904 in an area between the rough lapping depth and air bearing surface side 912 of row 900. Each slider 902 includes a plurality of conductive pads 908 and a sensor 909. Each ELG 906 is connected to a conductive pad 908 on two adjacent sliders 902. Although five sliders 902 are shown, row 900 may include more sliders 902.

In step 806 of FIG. 8, the kerfs 904 between sliders 902 in row 900 are partially parted from flex side 912 of the row 900. Flex side 910 of row 900 is opposite air bearing surface (ABS) side 912 of row 900. FIG. 10 illustrates row 900 with kerfs 904 partially parted. The depth of partially parting kerfs 904 corresponds with the rough lapping depth for lapping row 900.

In step 808 of FIG. 8, a resistance measurement system 1002 is connected to conductive pads 908 on one or more of the sliders 902 in row 900 to monitor the resistances of ELG's 906 in kerfs 904 of row 900. Resistance measurement system 1002 comprises any system capable or configured to measure a resistance or resistances.

In step 812, row 900 is rough lapped from air bearing surface side 912 of row 900. Multiple ELG's 906 are monitored during the rough lapping process using resistance measurement system 1002. Lapping forces are applied at multiple points during the rough lapping process. If one area of row 900 is lapped too slowly, the lapping forces in that area are increased to catch-up. If one area of row 900 is lapped too quickly, the lapping forces in that area are decreased. The monitoring of the resistance in step 808 is used to control the lapping force to lap row 900 uniformly. If the rough lapping process reaches the rough lapping depth as indicated by the resistance change of an ELG 906, then lapping force associated with that ELG 906 will be reduced such that the lapping in that area is stopped. The rest of row 900 is still lapped. Rough lapping of the whole row 900 is stopped when the monitored resistance of each ELG 906 indicates that rough lapping in the area of that ELG 906 has reached the rough lapping depth (i.e., the ELG 906 has been removed or worn away by the rough lapping process).

The resistance also indicates that the rough lapping process has reached the rough lapping depth and that row 900 has been separated into individual sliders 902. FIG. 11 illustrates the individual sliders 902 after lapping row 900. Because the depth of partially parting the kerfs 904 corresponds with the rough lapping depth (see FIG. 10), the lapping of row 900 in step 812 advantageously separates row 900 into individual sliders 902. Further cutting, parting, or separating is not needed because the rough lapping process in step 812 performs the separation. In step 814, the individual sliders 902 are final lapped to a target sensor height of the sensors 909 in each slider 902.

In summary, a lapping process advantageously separates a row of sliders without the need for further cutting, parting, or separating. Because the depth of partially parting the kerfs corresponds with the lapping depth desired for the lapping process, the lapping of the row separates the row into individual sliders. For AlTiC wafers, individual sliders do not need to be cut from rows using a mechanical cutting apparatus because the lapping process separates the sliders. For silicon wafers, individual sliders do not need to be parted from rows using a DRIE process because the lapping process separates the sliders. This avoids the problems of using the DRIE process to part the row after lapping the row. The lapping process also leaves a smooth surface on the individual sliders so that individual slider lapping is not as intensive.

We claim:

1. A method of manufacturing sliders, the method comprising:
   parting a wafer of sliders into rows of sliders, where the sliders in a row are connected by kerfs between the sliders;
   partially parting the kerfs between the sliders from a flex side of the row; and
   lapping the row of sliders from an air bearing surface (ABS) side of the row opposite the flex side to remove the remaining kerfs between the sliders to separate the row into individual sliders.

2. The method of claim 1 wherein lapping the row of sliders comprises:
   rough lapping the row of sliders.

3. The method of claim 2 further comprising:
   final lapping each of the individual sliders to a target sensor height of a sensor in each of the individual sliders.

4. The method of claim 1 wherein partially parting the kerfs between the sliders from a flex side of the row comprises:

partially parting the kerfs to a depth corresponding with a lapping depth for lapping the row.

5. The method of claim 1 wherein the wafer is made of a silicon material.

6. The method of claim 5 wherein parting the wafer into a row of sliders and partially parting the kerfs between the sliders comprise:
parting the wafer into the row of sliders and partially parting the kerfs between the sliders using a deep reactive ion etching (DRIE) process.

7. The method of claim 1 wherein the wafer is made of an Alumina Titanium Carbide (AlTiC) material.

8. The method of claim 7 wherein parting the wafer into a row of sliders and partially parting the kerfs between the sliders comprise:
parting the wafer into the row of sliders and partially parting the kerfs between the sliders using a mechanical cutting apparatus.

9. A method of manufacturing sliders from a silicon wafer, the method comprising:
parting the silicon wafer into rows of sliders using a deep reactive ion etching (DRIE) process, where the sliders in a row are connected by kerfs between the sliders;
partially parting the kerfs between the sliders from a flex side of the row using the DRIE process; and
lapping the row of sliders from an air bearing surface (ABS) side of the row opposite the flex side to remove the remaining kerfs between the sliders to separate the row into individual sliders.

10. The method of claim 9 wherein partially parting the kerfs between the sliders from a flex side of the row comprises:
partially parting the kerfs using the DRIE process to a depth corresponding with a lapping depth for lapping the row.

11. A method of manufacturing sliders from an Alumina Titanium Carbide (AlTiC) wafer, the method comprising:
parting the AlTiC wafer into rows of sliders using a mechanical cutting apparatus, where the sliders in a row are connected by kerfs between the sliders;
partially parting the kerfs between the sliders from a flex side of the row using the mechanical cutting apparatus; and
lapping the row of sliders from an air bearing surface (ABS) side of the row opposite the flex side to remove the remaining kerfs between the sliders to separate the row into individual sliders.

12. The method of claim 11 wherein partially parting the kerfs between the sliders from a flex side of the row comprises:
partially parting the kerfs using the mechanical cutting apparatus to a depth corresponding with a lapping depth for lapping the row.

13. A method of manufacturing sliders, the method comprising:
fabricating a wafer of sliders with electrical lapping guides (ELG) in kerfs connecting the sliders, wherein the ELGs are connected to conductive pads on the sliders of the wafer;
parting the wafer into rows of sliders, wherein each row includes sliders connected by kerfs with the ELG's in the kerfs;
for a row of sliders:
partially parting the kerfs in the row from a flex side of the row at a depth corresponding with a rough lapping depth;
connecting a resistance measurement system to the conductive pads on at least one of the sliders in the row to monitor resistances of the ELG's in the kerfs of the row; and
rough lapping the row of sliders from an air bearing surface (ABS) side of the row opposite the flex side until the resistances indicate that the ELGs connected to the sliders and the remaining kerfs between the sliders have been removed, that the rough lapping has reached the rough lapping depth, and that the row has been separated into individual sliders.

14. The method of claim 13 further comprising:
final lapping each of the individual sliders to a target sensor height of a sensor in each of the individual sliders.

15. The method of claim 13 wherein the wafer is made of a silicon material.

16. The method of claim 15 wherein parting the wafer into a row of sliders and partially parting the kerfs between the sliders comprise:
parting the wafer into the row of sliders and partially parting the kerfs between the sliders using a deep reactive ion etching (DRIE) process.

17. The method of claim 13 wherein the wafer is made of an Alumina Titanium Carbide (AlTiC) material.

18. The method of claim 17 wherein parting the wafer into a row of sliders and partially parting the kerfs between the sliders comprise:
parting the wafer into the row of sliders and partially parting the kerfs between the sliders using a mechanical cutting apparatus.

19. The method of claim 13 wherein the ELG's are positioned in the kerfs to correspond with the rough lapping depth for the sliders.

20. The method of claim 13 wherein fabricating the wafer comprises:
connecting one leg of an ELG to a conductive pad on a first slider and the other leg of the ELG to a conductive pad on a second slider adjacent to the first slider.

21. The method of claim 13 wherein fabricating the wafer comprises:
connecting one leg of an ELG to a conductive pad for a reader element in a slider and the other leg to a conductive pad for a writer element in the slider.

22. The method of claim 13 wherein fabricating the wafer comprises:
connecting one leg of one ELG to a conductive pad of a read or write element in a slider and the other leg to a conductive pad specifically created for an ELG measurement in the slider.

* * * * *